(12) United States Patent  
Inazu et al.

(10) Patent No.: US 7,331,598 B2
(45) Date of Patent: Feb. 19, 2008

(54) CURTAIN AIRBAG APPARATUS

(75) Inventors: Tadashi Inazu, Utsunomiya (JP); Kohei Okimoto, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 195 days.

(21) Appl. No.: 11/207,492

(22) Filed: Aug. 19, 2005

(65) Prior Publication Data  
US 2006/0043708 A1 Mar. 2, 2006

(30) Foreign Application Priority Data  
Aug. 31, 2004 (JP) ............................. 2004-251875

(51) Int. Cl.  
*B60R 21/16* (2006.01)
(52) U.S. Cl. ................... 280/728.2; 280/730.2
(58) Field of Classification Search ............. 280/728.2, 280/730.2, 749  
See application file for complete search history.

(56) References Cited  
U.S. PATENT DOCUMENTS

| 5,899,486 | A | | 5/1999 | Ibe |
| 5,921,575 | A | * | 7/1999 | Kretschmer et al. ..... 280/728.2 |
| 6,022,044 | A | * | 2/2000 | Cherry ..................... 280/730.2 |
| 6,102,434 | A | * | 8/2000 | Ohlert et al. ............ 280/728.2 |
| 6,340,169 | B1 | * | 1/2002 | Tietze ..................... 280/728.2 |
| 2003/0042712 | A1 | * | 3/2003 | Henderson et al. ...... 280/728.2 |
| 2004/0046366 | A1 | * | 3/2004 | Ochiai et al. ............ 280/728.2 |
| 2005/0046154 | A1 | * | 3/2005 | Rhea et al. .............. 280/728.2 |

FOREIGN PATENT DOCUMENTS

EP 1 112 900 A2 7/2001  
JP 3113977 9/2000

* cited by examiner

*Primary Examiner*—Paul N. Dickson  
*Assistant Examiner*—Robert A. Coker  
(74) *Attorney, Agent, or Firm*—Rankin, Hill, Porter & Clark LLP

(57) ABSTRACT

A curtain airbag apparatus is provided with a bag disposed along the upper edge of an opening of a vehicle body in a folded state, a plurality of protectors disposed along a lengthwise direction of the bag, which prevent the bag from interfering with the vehicle body; and brackets intervening between the bag and the vehicle body, which attach the bag to the vehicle body and support the protectors, wherein protectors adjacent to each other are spaced from each other in the lengthwise direction of the bag.

4 Claims, 7 Drawing Sheets

US 7,331,598 B2

CURTAIN AIRBAG APPARATUS

BACKGROUND OF THE INVENTION

1. Field of the Invention

The present invention relates to an airbag apparatus that expands when a collision occurs and protects a driver and passengers, in particular, to a curtain airbag apparatus incorporated along the upper edge of an opening of a vehicle.

Priority is claimed on Japanese Patent Application No. 2004-251875, filed on Aug. 31, 2004, the content of which is incorporated herein by reference.

2. Description of Related Art

A side curtain airbag apparatus, whose bag is attached along the upper edge of a side window of a vehicle in a folded state, and expands when a lateral collision occurs and protects the heads of a driver and passengers, has been known as a curtain airbag apparatus.

Generally, a bag used in the side curtain airbag apparatus is long-sized to be applied from the flank of the front seat of a vehicle to the flank of the rear seat thereof, and presents a long and band-shaped (or rod-shaped) pattern having flexibility in its folded state.

However, in the side curtain airbag apparatus, since a bag in its folded state is long and has flexibility, there is a fear in that, when a folded bag is attached to the vehicle body along the upper edge of a side window, the airbag may be twisted and be attached to the vehicle body in a twisted state.

For example, Japanese Patent Publication No. 3113977 has disclosed a technology by which an airbag in a folded state is bundled by a plurality of pieces of tape with prescribed intervals in the lengthwise direction, a marking is attached to one side of the respective tape, and the airbag is attached to a vehicle body while visually checking the marking so that it faces inside the vehicle interior, wherein twisting of the bag can be prevented.

However, the work of installing an airbag into a vehicle body while visually checking the marking attached to the tape is remarkably cumbersome, and productivity is lowered, and the burden on a worker is increased.

SUMMARY OF THE INVENTION

The present invention provides a curtain airbag apparatus, capable of preventing twisting of an airbag from occurring, which can be easily attached to a vehicle body and is excellent in conveyance thereof.

A curtain airbag apparatus according to the invention includes an airbag disposed along an upper edge of an opening of a vehicle body in a folded state; a plurality of protectors disposed along a lengthwise direction of the airbag, which prevent the airbag from interfering with the vehicle body; and brackets intervening between the airbag and the vehicle body, which attach the airbag to the vehicle body and support the protectors; wherein protectors adjacent to each other are spaced from each other in the lengthwise direction of the airbag.

With such a construction, since portions between the protectors of an airbag in a folded state can be folded in the step prior to installation in the vehicle body, it is possible to convey airbags in a compactly folded state.

In addition, when attaching the airbags to a vehicle body in a folded state, it is possible to prevent the airbags from being twisted by virtue of existence of the protectors.

Further, after the airbag is attached to the vehicle body, it is possible to prevent, by means of the protectors, the airbag from interfering with the vehicle body when the airbag expands.

According to the invention, since the airbag can be folded in and be made small-sized, conveyance efficiency of the airbags can be increased in a stage before attaching the same to the vehicle body. Further, this is very convenient in terms of storing the same.

Also, since twisting of the airbag can be prevented by the protectors, it becomes possible to correctly attach the airbag to the vehicle body. Further, efficiency of the attaching work can be improved, and productivity is increased. In addition, since the protectors prevent interference between the airbag and the vehicle body when the airbag expands, the airbag can be caused to accurately expand.

DETAILED DESCRIPTION OF THE INVENTION

Hereinafter, a description is given of one embodiment of the curtain airbag apparatus according to the invention with reference to the drawings from FIG. 1 through FIG. 7. Also, a curtain airbag apparatus according to the present embodiment is a side curtain airbag apparatus, disposed along the upper edge of a side window of a vehicle, for protecting the heads of a driver and passengers by expansion of the airbag when a lateral collision occurs.

Figure 7:
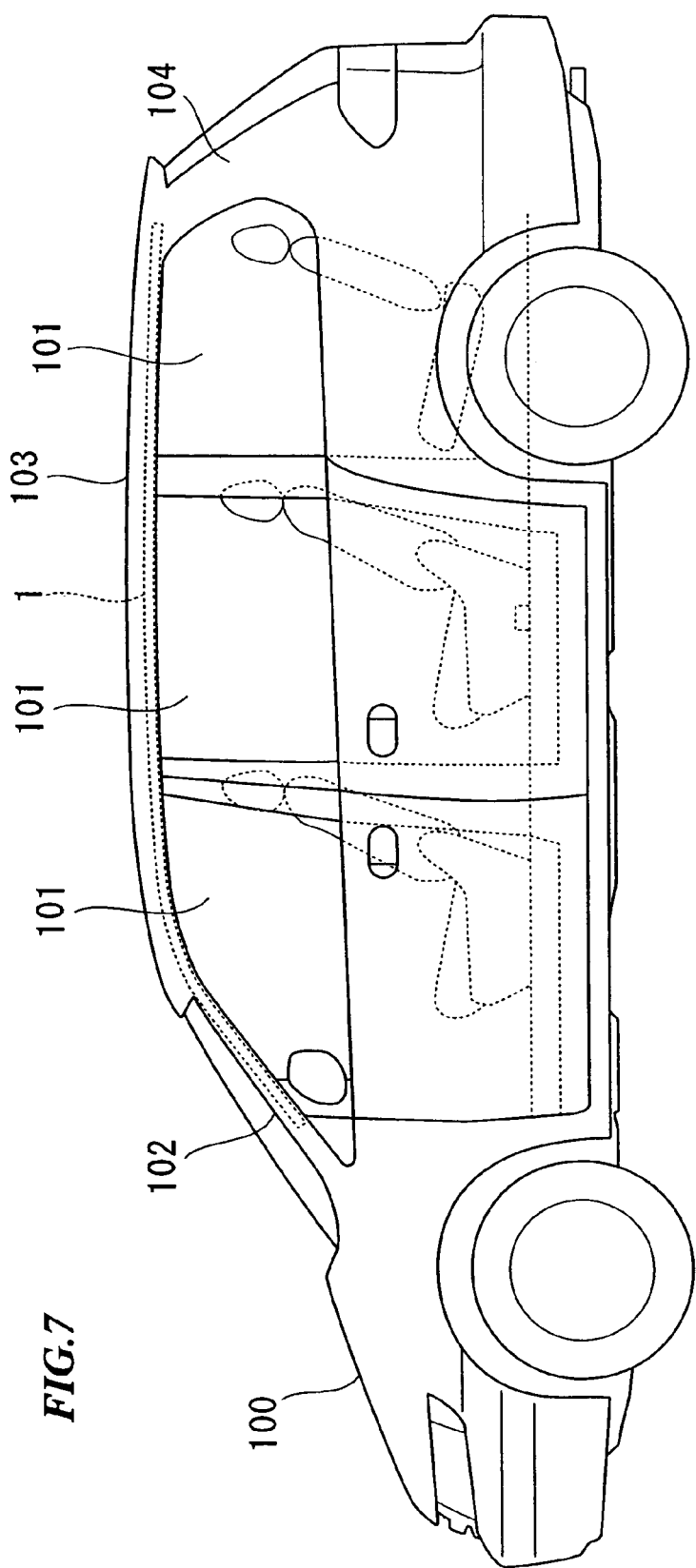
FIG. 7 is a side view of a vehicle provided with a curtain airbag apparatus according to the invention.

As shown in FIG. 7, a side curtain airbag apparatus 1 is disposed in an area covering a front pillar portion 102 to a roof side rail portion 103 along the upper edge of a side window (an opening) 101 of a vehicle body 100.

Figure 1:
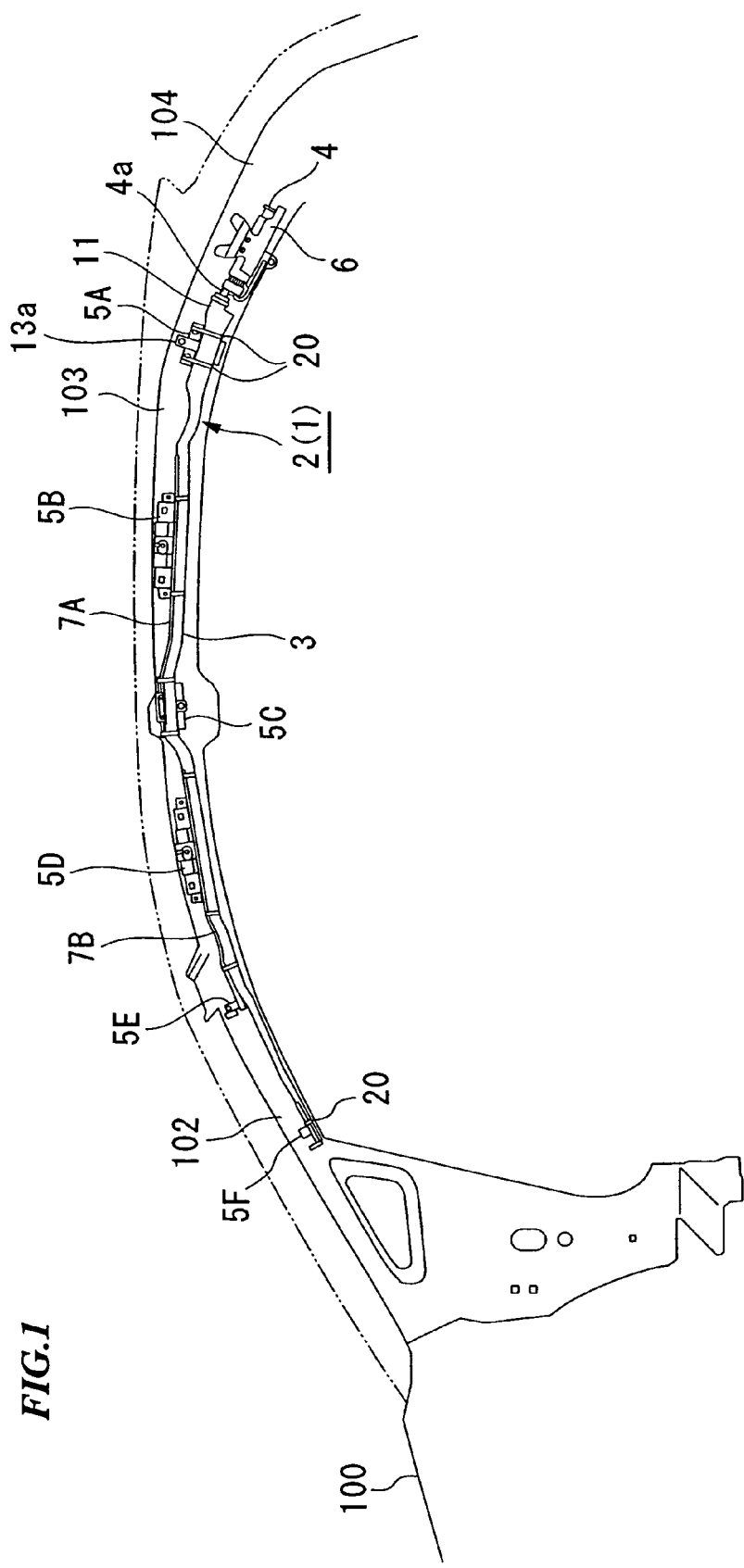
FIG. 1 is a general view showing a curtain airbag apparatus according to the invention in a state where it is attached to a vehicle body.

The side curtain air bag apparatus 1 is made into units as shown in FIG. 1 prior to attaching the same to the vehicle 100. A side curtain airbag unit (hereinafter simply called an "airbag unit") 2 is provided with a nylon-made bag 3, an inflator 4, six brackets 5A through 5F, a bracket 6, and two protectors 7A and 7B. The nylon-made bag 3 is folded in and presents a long band-like shape. The inflator 4 generates a gas for expansion of the bag. The brackets 5A through 5F are provided to attach the bag 3 to the vehicle body 100. The bracket 6 is provided to attach the inflator 4 to the vehicle body 100. The protectors 7A and 7B are provided to prevent the bag 3 from interfering with the vehicle body 100.

The inflator 4 is fixed at the roof side rail portion 103 in the vicinity of a linkage portion with the rear pillar portion 104 with bolts (not illustrated) via the bracket 6. A gas discharge portion 4a of the inflator 4 is connected to a gas introduction portion 11 secured at one end (base portion) in the lengthwise direction of the bag 3. The inflator 4 is provided with an igniter and a gas generating agent (both of which are not illustrated), wherein the gas generating agent is ignited by the igniter to burn the gas generating agent, thereby instantaneously generating a gas, and the gas is supplied into the bag 3 for expansion thereof.

The base portion of the bag 3 is disposed at the vehicle rear portion side of the roof side rail portion 103, and the end portion of the bag 3 (the other end portion in the lengthwise direction of the bag 3) is restricted by pieces of tapes 20 disposed with a suitable spacing in the lengthwise direction thereof, which maintain its folded state. In addition, the pieces of tape 20 are broken by expansion of the bag 3 when the bag expands. The bag 3 has a size and a shape which can cover almost all the entirety of the side window 101 when it expands.

The brackets 5A through 5F by which the bag 3 is fixed to the vehicle body 100 are disposed with spacing secured in the lengthwise direction of the bag 3.

The base portion of the bag 3 is fixed at the roof side rail portion 103 via the bracket 5A. Speaking in detail, the lug portion 13a provided at the base portion of the bag 3 is supported by the bracket 5A, and the bracket 5A is fixed at the roof side rail portion 103 by bolts (not illustrated). The tape 20 for restricting the base portion of the bag 3 is wound include the bracket 5A.

The end of the bag 3 is fixed at the front pillar portion 102 via the bracket 5F. Speaking in detail, the lug portion (not illustrated) secured at the tip portion of the bag 3 is supported by the bracket 5F, and the bracket 5F is fixed on the front pillar portion 102 by bolts (not illustrated). The tape 20 for restricting the tip portion of the bag 3 is wound to include the bracket 5F.

Further, the bag 3 is fixed at the roof side rail portion 103 via the brackets 5B, 5C and 5D, and is fixed at the front pillar portion 102 by the bracket 5E.

The two protectors 7A and 7B are made of plastic and are light in weight. The protectors 7A and 7B are disposed along the bag 3 between the base portion of the bag 3 and the tip portion thereof, and have a prescribed length along the lengthwise direction of the bag. Further, the protectors 7A and 7B are disposed with spacing left at a prescribed internal in the lengthwise direction of the bag 3.

The protector 7A is supported by the bracket 5C, and at the same time, is linked with the bracket 5B. The protector 7B is supported by the bracket 5E, and at the same time, is linked with the bracket 5D.

Figure 2:
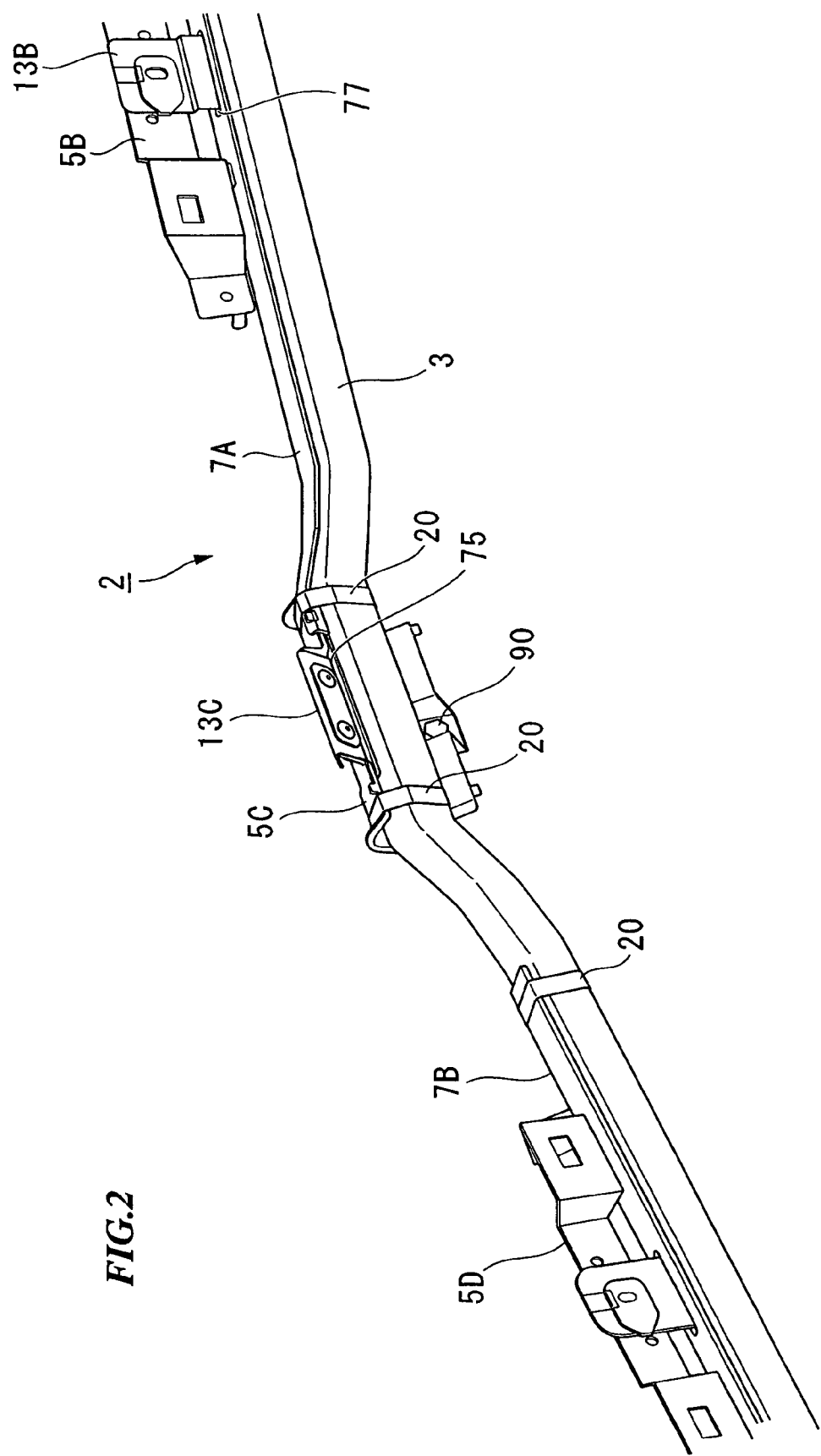
FIG. 2 is a perspective view showing a part of a side curtain airbag unit when being viewed from the side where it is installed facing the inner side of the vehicle.

Hereinafter, with reference to the drawings FIG. 2 through FIG. 6, a detailed description is given of an attaching structure of the bag 3, the bracket 5C and the protector 7A. Here, FIG. 2 is a perspective view showing a side curtain airbag unit 2 around the bracket 5C when being viewed from the side where it is disposed facing the inner side of the vehicle, FIG. 3 is an enlarged perspective view showing the surrounding of the bracket 5C, FIG. 4 is an enlarged perspective view showing the surrounding of the bracket 5C when looking at the same through a part of the airbag, FIG. 5 is a perspective view showing the portion shown in FIG. 2 from its rear side (that is, from the side where it is disposed facing the side rail portion 103), and FIG. 6 is an enlarged perspective view showing a part of the protector 7A.

Figure 6:
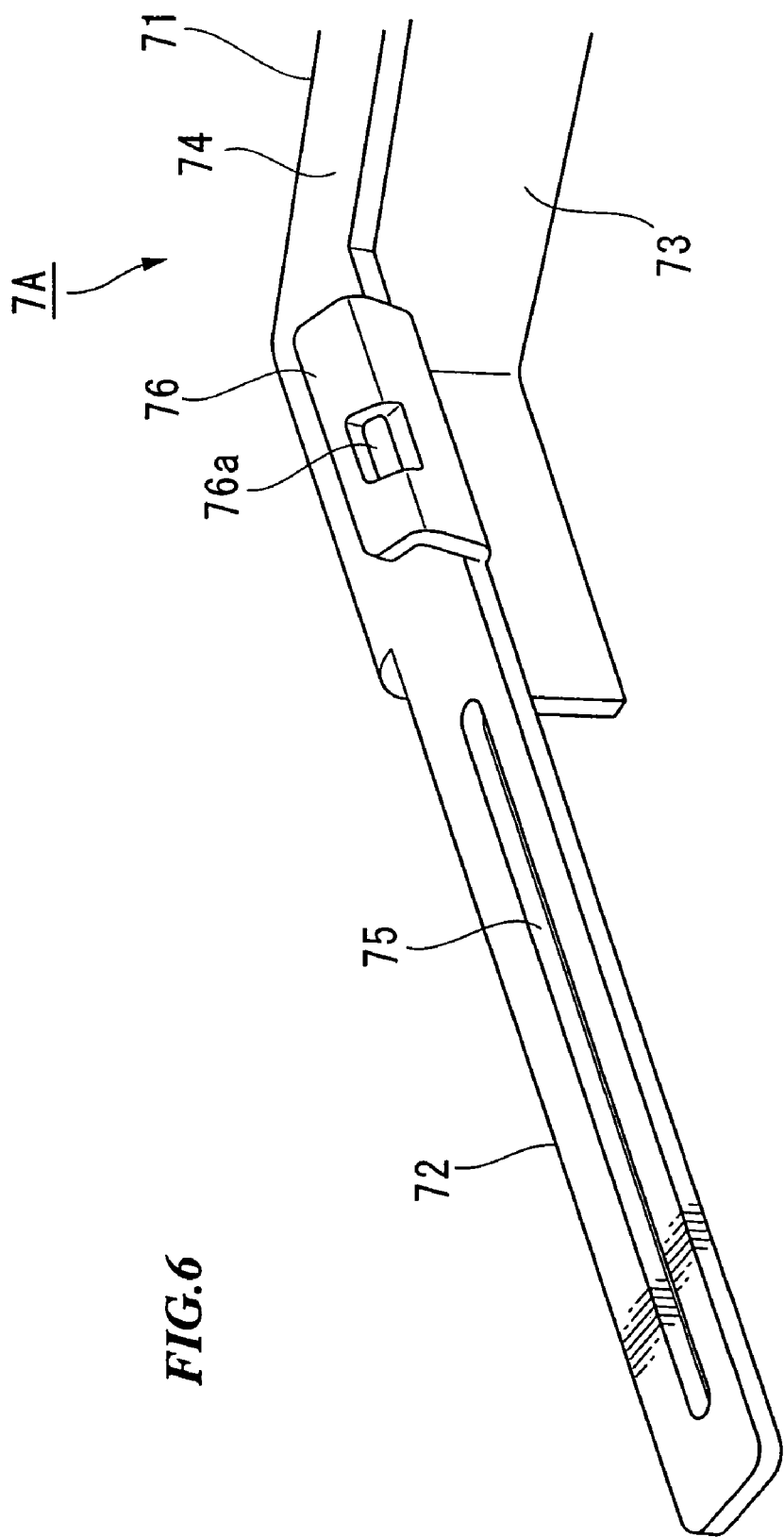
FIG. 6 is an enlarged perspective view showing a part of the protector.

As shown in FIG. 6, the protector 7A is provided with a main portion 71 whose section is L-shaped, and a flat plate-shaped bag supporting portion 72 extending from the main portion 71. The main portion 71 is provided with a flat plate-shaped vertical portion 73 and a flat plate-shaped horizontal portion 74. The flat plate-shaped vertical portion 73 is disposed facing the side rail portion 103, and the horizontal portion 74 extends in a substantially horizontal direction from the upper edge of the vertical portion 73. The bag-supporting portion 72 is formed so as to cause the horizontal portion 74 to extend.

A slender slit 75 is made in the bag-supporting portion 72 over almost the entire length of the bag-supporting portion 72. Also, the bracket portion 76 is provided at the end portion of the main portion 71. The bracket portion 76 extends upward from the end part of the horizontal portion 74 at the inner side of the vehicle body and is bent in a direction approaching to the side rail portion 103. A stopping hole portion 76a is formed at the bent portion thereof.

Figure 3:
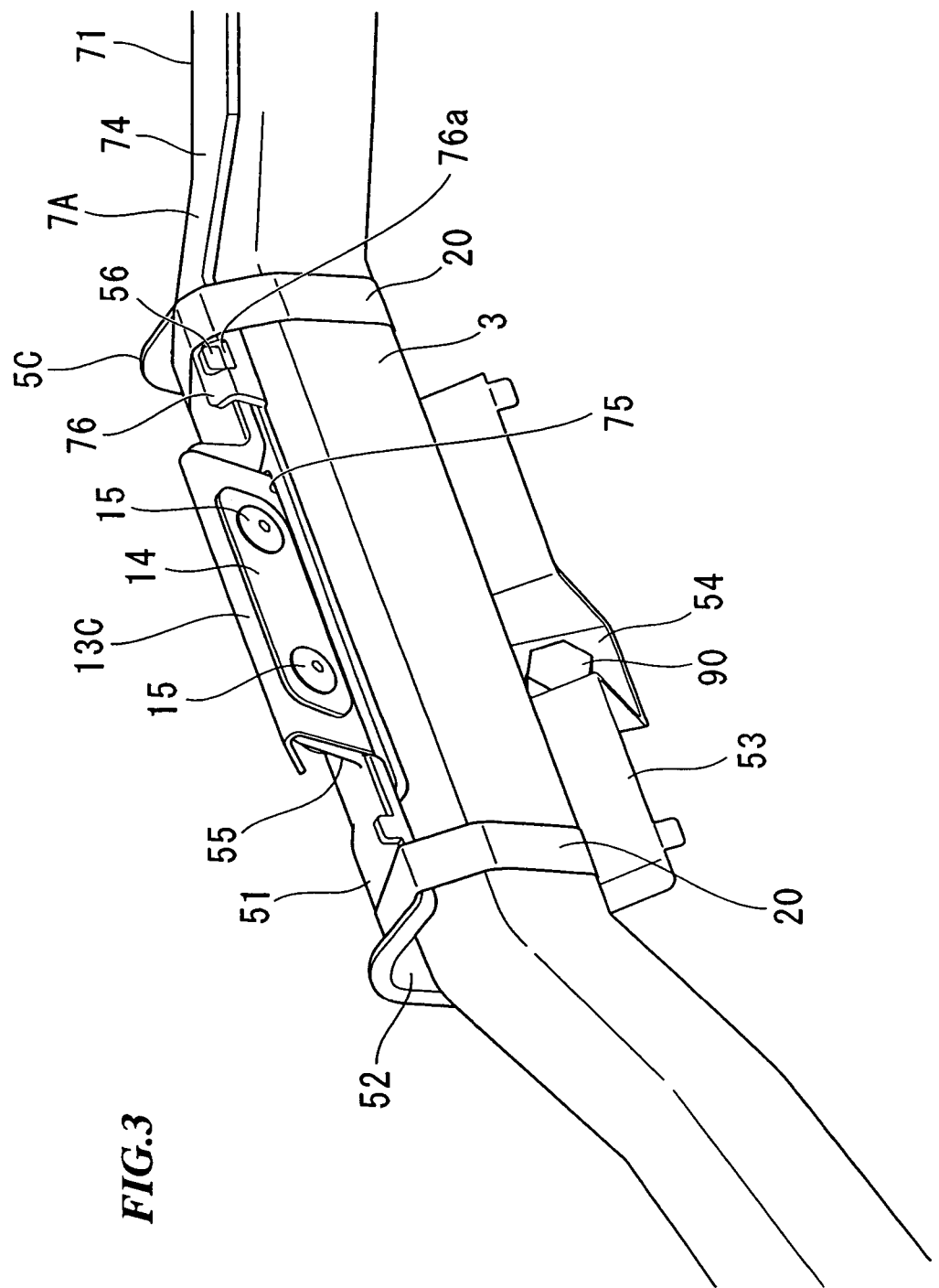
FIG. 3 is an enlarged perspective view showing the major parts of the side curtain airbag unit.
Figure 4:
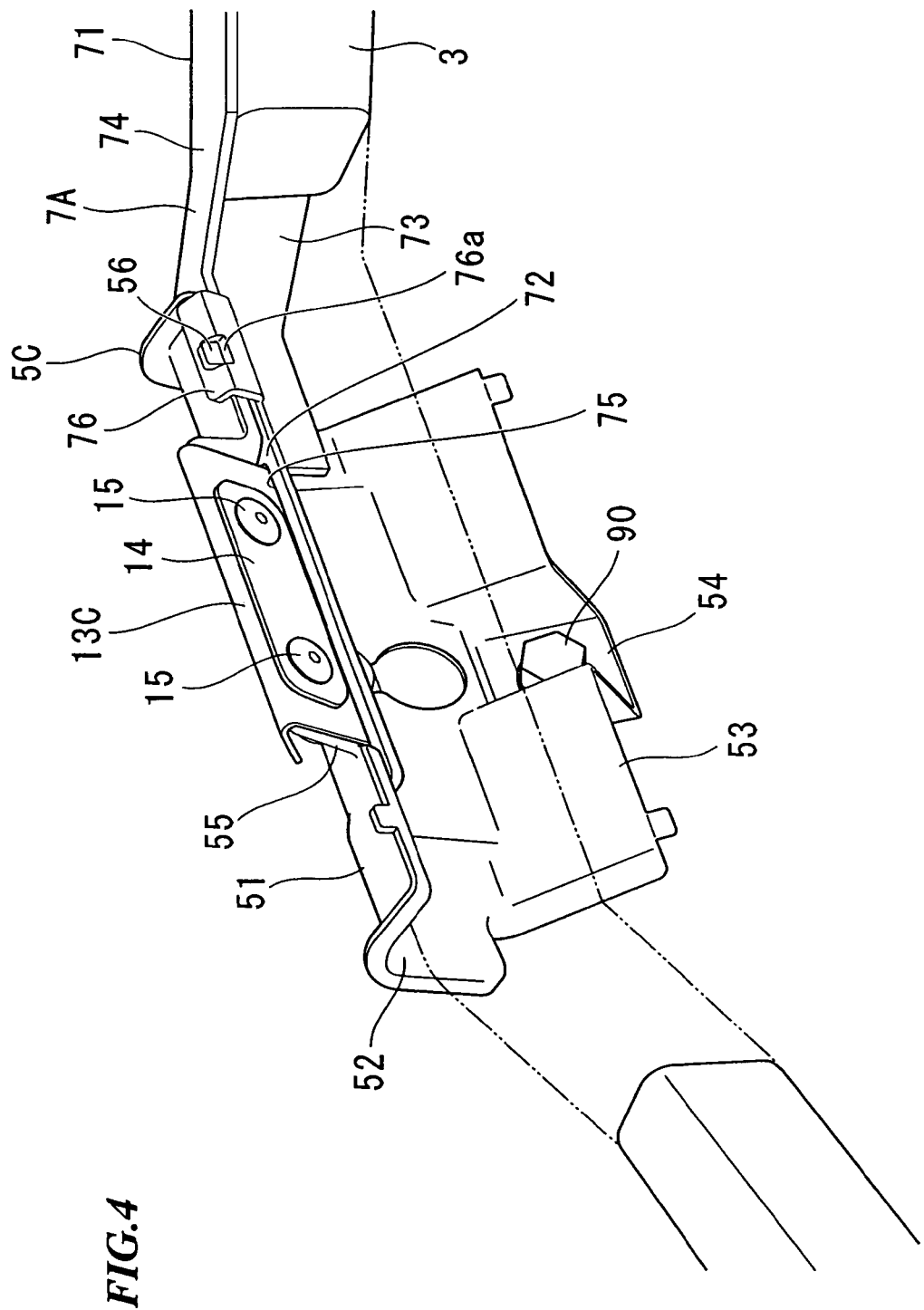
FIG. 4 is a partially enlarged perspective view showing the major parts of the side curtain airbag unit when looking at the same through a part of the airbag.
Figure 5:
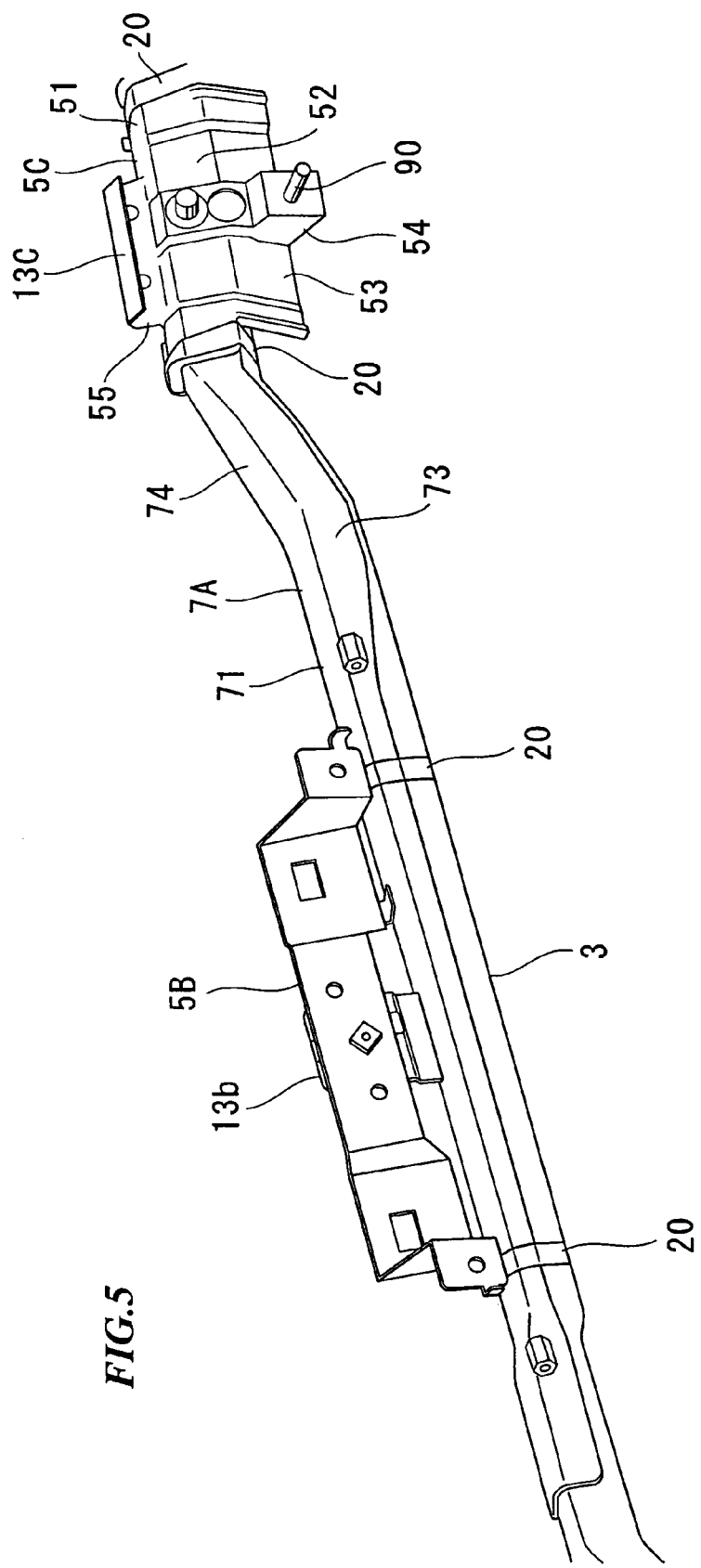
FIG. 5 is a perspective view showing a part of the side curtain airbag unit when being viewed from where it is disposed facing the vehicle body.

As shown in FIG. 3 through FIG. 5, the bracket portion 5C is provided with an upper side part 51, a side wall part 52, a base part 53, a base seat part 54, a flange part 55, and a stopping finger 56. The upper side part 51 is disposed on the bag-supporting portion 72 of the protector 7A. The side wall part 52 is provided at the end at the side approaching the side rail portion 103 of the upper side part 51, and it is bent and extends downward. The base part 53 is provided at the lower edge of the side wall part 52, and is bent diagonally downward and extends toward the inner side of the vehicle. The base seat part 54 is provided so as to be recessed from the middle part to the side rail portion 103 side. The flange part 55 is provided at the end part, at the inner side of the vehicle, of the upper side part 51 and extends upward. The stopping finger 56 is provided at a portion, spaced from the flange part 55, of the end at the inner side of the upper side part 51, and extends upward.

Note that, in comparing the length of the side wall part 52 along the lengthwise direction of the bag 3 with that of the base part 53 therealong, the length of the base part 53 is shorter than that of the side wall part 52.

The bag 3, the bracket 5C and the protector 7A are integrated as shown below. First, the bag supporting portion 72 of the protector 7A is disposed along the lower side of the upper side part 51 of the bracket 5C, and the stopping finger 56 of the bracket 5C is stopped by being inserted into the stopping hole 76a of the protector 7A, whereby the protector 7A is supported by the bracket 5C in a state where the entire length of the bag supporting portion 72 is covered by the bracket 5C. That is, the protector 7A does not protrude from one end side (the forward side of the vehicle) of the bracket 5C.

Next, the side, to be disposed at the outer side of the vehicle, of the bag 3 is disposed along the vertical portion 73 of the protector 7A and the side wall part 52 of the bracket 5C, and the side to be disposed upward of the bag 3 is disposed along the bag supporting portion 72 and horizontal portion 74 of the protector 7A and along the upper side part 51 of the bracket 5C. At this time, the lug portion 13c extending from the end portion of the bag 3 is inserted from the underside of the slit 75 of the protector 7A through the upper side thereof, and is disposed along the flange part 55 of the bracket 5C.

Furthermore, a fitting plate 14 is applied to the lug portion 13c of the bag 3, wherein the lug portion 13c is placed between the fitting plate 14 and the flange part 55 of the bracket 5C and is fixed by a rivet 15. Furthermore, as shown in FIG. 3 and FIG. 5, the pieces of tape 20 are wound on the bag 3, including both ends of the bracket 5C, and the bag 3 is bundled. In this case, no tape 20 is provided on the base part 53 of the bracket 5C. In addition, the bracket 5C is fixed at the side rail portion 103 by bolts 90 inserted into the base seat part 54.

Furthermore, as shown in FIG. 2, a slender slit 77 is also formed at a portion, spaced by a prescribed dimension from the bag supporting portion 72, of the horizontal portion 74 of the main portion 71 of the protector 7A. Another lug portion 13b extending from the end part of the bag 3 is inserted into the slit 77 from the underside thereof through the upper side thereof. The lug portion 13b is fixed at the bracket 5B using a fitting plate and a rivet (both of which are not illustrated) by a method similar to that for the lug portion 13c. In addition, the protector 7A protrudes from both ends of the bracket 5B in the length of the vehicle body.

The shape and size of the bracket 5E differ from those of the bracket 5C. However, these brackets have the same structure. Therefore, the description thereof is omitted. The bracket 5E functions just as the bracket 5C, wherein the bracket 5E supports the protector 7B, and at the same time, fixes the bag 3 to the vehicle body 100. The bracket 5D is entirely the same as the bracket 5B.

Note that, in the completed airbag unit 2, the end part of the bracket 5C and the end part of the protector 7B are spaced from each other in the lengthwise direction of the bag 3 and disposed there. The distance therebetween is set to the minimum dimension by which the bag 3 can be folded up.

The side curtain airbag apparatus 1 thus constructed has the bag 3 foldable at the portions where the protectors 7A and 7B are not attached, in a state before the airbag unit 2 is attached to the vehicle body 100. Therefore, it is possible to convey the airbag unit 2 in a compactly folded state. This is very convenient in view of storing the same.

In addition, since the protectors 7A and 7B prevent the bag 3 from being twisted, it is possible to prevent the bag 3 from being twisted and attached to the vehicle body 100 when the airbag unit 2 is attached to the vehicle body 100. Also, since the distance between the bracket 5C and the protector 7B is short, there is no case where the bag 3 is twisted therebetween. Accordingly, it becomes possible to easily and accurately attach the airbag unit 2 to the vehicle body 100. As a result, efficiency in attaching the airbag 3 is improved, and productivity is also improved.

Further, after the airbag unit 2 is attached to the vehicle body 100, the protectors 7A and 7B prevent the bag 3 from interfering with the vehicle body 100 when the bag 3 expands, where it becomes possible to correctly cause the bag 3 to expand.

While a preferred embodiment of the invention has been described and illustrated above, it should be understood that this is exemplary of the invention and is not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

For example, in the embodiment described above, although two protectors are provided with respect to a single bag, three or more protectors may be provided. In addition, in the embodiment described above, although two brackets are disposed with respect to a single protector, there is no limit to the number of brackets.

What is claimed is:

1. A curtain airbag apparatus comprising:
   a bag disposed along an upper edge of an opening of a vehicle body in a folded state;
   a plurality of protectors disposed along a lengthwise direction of the bag, said protectors partially surrounding said bag and preventing the bag from interfering with the vehicle body; and
   a plurality of brackets intervening between the bag and the vehicle body, at least one of said plurality of brackets partially surrounding an associated one of the protectors and serving to attach the bag to the vehicle body and support the associated protector;
   wherein protectors adjacent to each other are spaced from each other in a lengthwise direction of the bag, and said bag projects beyond said associated protector and is directly affixed to said at least one bracket.

2. The curtain airbag apparatus of claim 1, wherein each of said protectors extend between two of said plurality of brackets.

3. The curtain airbag apparatus of claim 1, wherein the bag further comprises a lug portion and the associated protector defines a slit through which the lug portion extends, said lug portion being directly secured to said at least one bracket.

4. The curtain airbag apparatus of claim 1, wherein said associated protector includes a bracket portion defining a stopping hole, wherein the at least one bracket further includes a stopping finger that is received in the stopping hole, whereby the associated protector is secured to the at least one bracket by engagement of the stopping finger with the bracket portion.

* * * * *